United States Patent
Richter et al.

(10) Patent No.: US 7,150,613 B2
(45) Date of Patent: Dec. 19, 2006

(54) CONTAMINATION-FREE MAGNETIC STAMPER HOLDER

(75) Inventors: J. Hans Richter, Lancaster, PA (US); George G. Ruth, Columbia, PA (US); Matthew E. Thompson, Lancaster, PA (US)

(73) Assignee: Richter Precision Inc., East Petersburg, PA (US)

( * ) Notice: Subject to any disclaimer, the term of this patent is extended or adjusted under 35 U.S.C. 154(b) by 103 days.

(21) Appl. No.: 11/111,576

(22) Filed: Apr. 21, 2005

(65) Prior Publication Data

US 2005/0260298 A1    Nov. 24, 2005

Related U.S. Application Data

(60) Provisional application No. 60/573,911, filed on May 24, 2004.

(51) Int. Cl.
*B29D 11/00* (2006.01)
(52) U.S. Cl. ........................ 425/3; 425/192 R; 425/810; 425/DIG. 33
(58) Field of Classification Search ............ 425/3, 425/192 R, 542, 810, DIG. 33
See application file for complete search history.

(56) References Cited

U.S. PATENT DOCUMENTS

| | | | |
|---|---|---|---|
| 4,472,124 A | 9/1984 | Kashihara et al. | |
| 5,552,098 A | 9/1996 | Kudo et al. | |
| 5,612,062 A * | 3/1997 | Takahashi | 425/3 |
| 5,798,122 A * | 8/1998 | Takahashi | 425/3 |

FOREIGN PATENT DOCUMENTS

| | | |
|---|---|---|
| EP | 0974442 | 1/2000 |
| JP | 5062252 | 3/1993 |
| JP | 2001-334532 | * 12/2004 |

* cited by examiner

*Primary Examiner*—Donald Heckenberg
(74) *Attorney, Agent, or Firm*—Martin Fruitman

(57) ABSTRACT

The apparatus is a contamination free stamper holder for molding discs for information storage. The stamper, the disc part of the mold holding the pits and grooves to be formed on the molded plastic, is held within the mold by one or more magnets that are completely enclosed within non-magnetic material. The wall thickness of the enclosing material between the magnets and the stamper is limited so that there is no significant loss in magnetic attraction.

8 Claims, 1 Drawing Sheet

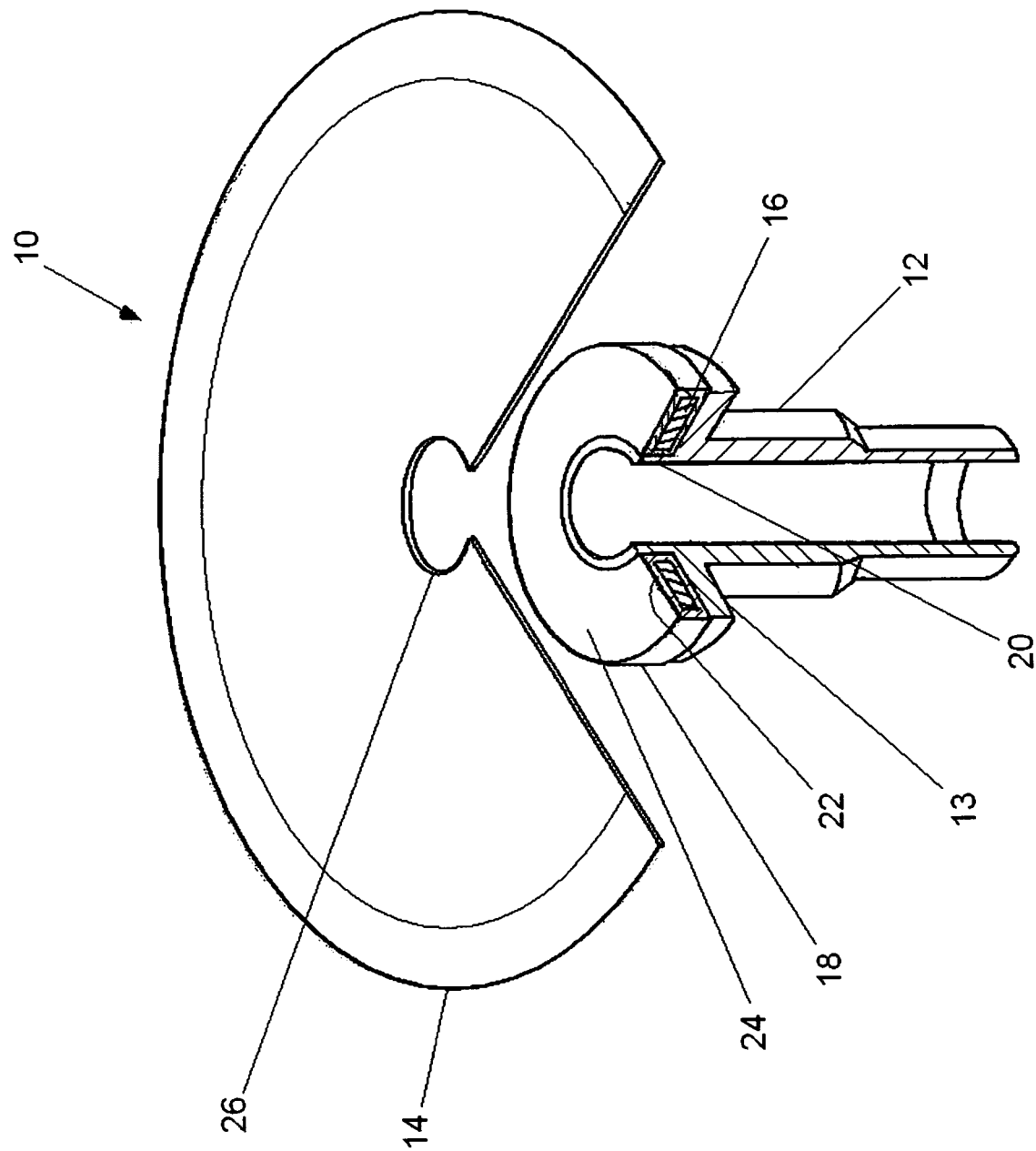

CONTAMINATION-FREE MAGNETIC STAMPER HOLDER

BACKGROUND OF THE INVENTION

This application is based upon provisional patent application Ser. No. 60/573,911 filed May 24, 2004.

The invention deals generally with a mold for manufacturing information recording discs such as compact discs, CDs, and DVDs. In order to mold these discs a thin plate containing a mirror image of digital information is held inside the mold cavity. This plate is typically referred to as a "stamper plate" or simply a "stamper", is usually made of nickel, and the digital information is represented as a series of pits and grooves. The stamper generally has an outer diameter of about 138 mm., an inner diameter, at a central hole, of 20.0 to 37.4 mm., and a thickness of approximately 0.32 mm.

The material for the disc, which is molded in contact with the stamper to create a duplicate of a master, is generally a polycarbonate plastic. The stamper is held centered within the mold cavity at its inner diameter and held in the mold by vacuum, magnetic, or mechanical means, or a combination of these, acting at the stamper's inner diameter, outer diameter, or along the surface of the underside of the stamper. These mold components are referred to as "stamper holders".

One typical mechanical means used by these stamper holders to hold the stamper inner diameter is a low profile lip, but the impression of this lip is then molded into the disc. This lip impression may cause problems for the silk screen printing that occurs as a secondary operation after molding by causing printing distortions or damage to the silk screen used in the printing.

To alleviate this problem stamper holders have been produced that eliminate the mechanical lip feature. Such designs then permit disc manufacturers to print closer to the inner diameter of the molded disc, thereby creating an aesthetic improvement and a market advantage.

This has been done by the use of temperature resistant magnets incorporated into the stamper holder to hold the stamper in place. Typically this involves a centering feature that is approximately 20 mm. in diameter and is raised approximately 0.320 mm. above the planar surface of the stamper holder that includes embedded magnets. The stampers used in such a system are manufactured with a 20 mm. inner diameter so that they will center properly on such a stamper holder.

The magnets embedded in the stamper holder surface are typically rod shaped magnets, and they are placed in a circular pattern around the raised centering feature. These magnets are usually formed from a temperature resistant rare earth material such as samarium cobalt, neodymium iron boron, or the like, and they are typically held within the stamper holder with a temperature resistant resin.

However, since these magnets are exposed directly to the stamper, several problems can occur during high production molding processes. Exposed magnets tend to chip or break thereby releasing contamination beneath the stamper, and this causes molding failures and damage to the stamper and other mold components. Another failure mode is caused by poor adhesion. This allows the magnets to lift out of their recesses during use and causes molding failures and precipitates magnet chipping and breaking.

Wear is another problem. Thin wear resistant films such as those deposited by physical vapor deposition, chemical vapor deposition, plasma assisted chemical vapor deposition, thermo-reactive diffusion, and carborizing and nitrocarborizing are applied to stamper holders to improve wear resistance, but they do not adhere well to rare earth materials. When the coating flakes off of the magnets there is no protection for this most fragile part of the assembly. Furthermore, the exposed surfaces of the magnets make it difficult to achieve a good surface finish on the stamper holder surface with which the stamper is in contact. This poor surface also causes wear, especially on the stamper.

Finally, the rod magnets in a circular pattern may not have sufficient magnetic strength. This causes distortion of the stamper and disc around the inner diameter which detracts from the aesthetics, and may even cause discs to be rejected on quality criteria.

It would be very beneficial to have available a magnetic stamper holder that did not have these problems, so that the ease of use of the magnetic stamper holder was not negated by poor wear characteristics and contamination from the magnets chipping and breaking.

SUMMARY OF THE INVENTION

The present invention provides a contamination free stamper holder for molding information discs by completely enclosing the magnet or magnets. Whether the magnetic attraction is provided by permanent magnets in the configurations of multiple individual magnets or a ring magnet, and even if it is a provided by an electromagnet, the magnet or magnets are completely enclosed. This is accomplished by completely enclosing the magnet in a magnet holder, which is then attached to the stamper holder. In order to maintain the attraction of the magnet, the enclosing material is non-magnetic, and the wall thickness of the wall between the magnet and the stamper is minimized.

The magnet is conventionally constructed from rare earth material which prevents the high operating temperatures of the molding process from affecting the magnetic strength. The enclosed magnet is highly resistant to chipping and breaking, but even if they should occur, no contaminating material will be released into the mold to cause further damage. Furthermore, the enclosed magnet also can not move out of its location and cause problems in that manner. Previous wear problems are also alleviated. Thin wear resistant films applied directly to austenitic stainless steel, which is used for the enclosing material in the preferred embodiment, have excellent adhesion characteristics, so wear resistance of that area of the stamper holder is greatly improved, and with a continuous surface of a single material a better surface finish can be achieved, which will also improve the wear characteristics.

The structure of the present invention, particularly the preferred embodiment of an enclosed ring magnet, also allows a significant increase in the active surface area of the magnet. This increases the magnetic strength of the present invention over the prior art and greatly reduces the aesthetic disc problems caused by weak magnets in the prior art.

The present invention thereby significantly improves the production of information carrying discs by assuring that there is no contamination from the magnets holding the stamper in the mold, permitting superior surface finishes on the stamper holder, and providing a stronger magnet attraction force.

BRIEF DESCRIPTION OF THE DRAWING

The DRAWING is partially cut away perspective view of the preferred embodiment of the assembly of the invention showing the stamper holder with the stamper slightly separated from the stamper holder.

DETAILED DESCRIPTION OF THE INVENTION

The DRAWING is partially cut away perspective view of the preferred embodiment of assembly 10 of the invention showing stamper holder 12 with stamper 14 slightly separated from stamper holder 12. When the mold in which assembly 10 is installed is in use, stamper 14 is in direct contact with and centered upon stamper holder 12. In this preferred embodiment magnet 16 is a ring magnet. Magnet holder 18 completely encloses magnet 16, is attached to stamper holder 12, and is supported by magnet support surface 13, which is attached to and extends perpendicularly away from core 20. It is magnet holder 18 that is in contact with stamper 14.

To maximize the attraction of magnet 16 to stamper 14, the material of magnet holder 18 is non-magnetic, and the thickness of wall 20 of magnet holder 18 that is between magnet 16 and stamper 14 is minimized.

Magnet 16 is conventionally constructed from rare earth material such as samarium cobalt, neodymium iron boron, or the like, which insures that the high operating temperatures of the molding process do not reduce the magnetic strength of the magnets, as may happen with ordinary magnets. In the preferred embodiment, magnet holder 18, is made of austenitic stainless steel or some other non-magnetic material. The attachment between magnet holder 18 and stamper holder 12 can be any conventional means, including, as shown, a press fit of magnet holder 18 around raised core 20 of stamper holder 12.

Wall 22 between magnet 16 and exposed planar surface 24 of magnet holder 18 is constructed with a thickness in the range of between 0.070 and 0.250 mm. With that thickness and austenitic stainless steel used for magnet holder 18, neither the material nor the thickness of wall 22 will significantly affect the ability of magnet 16 to hold stamper 14, which is in contact with exposed surface 24 when the mold is being used.

Stamper holder 12 is made of hardened material such as 440 C stainless steel or any other material with a hardness greater than 35 Rc. Stamper holder 12 includes raised core 20 which acts as a centering fixture for both magnet holder 18 and stamper 14. Raised core 20 extends above exposed planar surface 24 of magnet holder 18. In the preferred embodiment this extension is 0.300 to 0.320 mm., and inner diameter 26 of stamper 14 fits closely around core 20. Because stamper 14 has a nickel composition it tends to cause abrasive wear on core 20, and the specified hardness of greater than 35 Rc helps retard this abrasive wear.

Thin wear resistant films, such as TiN, TiCN, DLC, are applied to surface 24 of magnet holder 18. Since such coating adhere very well to austenitic stainless steel, the wear resistance of surface 24 is greatly improved. Furthermore, since surface 24 is a continuous surface composed of one material, a better surface finish is attained, which also improves the wear characteristics.

Therefore, the present invention prevents disconnected parts of the magnet or the surface wear coatings from contaminating the stamper and other mold components, and permanently maintains the magnet in its original position. This factor adds significantly to the quality and yield of the discs being produced.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For example, ring magnet 16 can be replaced with multiple individual magnets in a circular array approximating the shape of ring magnet 16, and stamper holder 14 can be of a different configuration as may be required by the construction of the particular mold in which it is being used.

What is claimed as new and for which Letters patent of the United States are desired to be secured is:

1. A stamper holder for disc molding production comprising:
    a core structure with a magnet support surface attached to the core and perpendicularly oriented to the core structure;
    a magnet holder constructed of non-magnetic material, attached to the stamper holder, resting on the magnet support surface, and including an exposed surface for contacting a stamper; and
    a magnetic structure completely enclosed within the magnet holder.

2. The stamper holder of claim 1 wherein the magnetic structure is a single magnet constructed in a ring configuration.

3. The stamper holder of claim 1 wherein the magnet holder includes a wall separating the magnetic structure and the exposed surface of the magnet holder, and the wall has a thickness in the range of between 0.070 and 0.250 mm.

4. The stamper holder of claim 1 wherein the exposed surface of the magnet holder is composed of a single material.

5. The stamper holder of claim 1 wherein core structure of the stamper holder is constructed of a material with a hardness greater than 35 Rc.

6. The stamper holder of claim 1 wherein thin wear resistant films are applied to the exposed surface of the magnet holder.

7. The stamper holder of claim 1 wherein the magnet holder is constructed of austenitic stainless steel.

8. The stamper holder of claim 1 wherein the magnet holder is held on the stamper holder with a press fit of the magnet holder on the core structure.

* * * * *